United States Patent
Pershall

(10) Patent No.: US 6,539,759 B2
(45) Date of Patent: Apr. 1, 2003

(54) RETRACTABLE HITCHING POST FOR BICYCLES

(76) Inventor: Terrence W. Pershall, 207 Caldoria St., Santa Cruz, CA (US) 95062

( * ) Notice: Subject to any disclaimer, the term of this patent is extended or adjusted under 35 U.S.C. 154(b) by 0 days.

(21) Appl. No.: 09/905,466

(22) Filed: Jul. 13, 2001

(65) Prior Publication Data

US 2003/0010074 A1 Jan. 16, 2003

(51) Int. Cl.$^7$ .............................................. E05B 71/00
(52) U.S. Cl. .............................. 70/234; 70/235; 211/5; 248/551; 280/297
(58) Field of Search .......................... 70/234, 235, 62, 70/233, 258; 16/82, 113.1; 211/5; 248/507, 508, 551, 552; 49/131; 280/297, 288.4

(56) References Cited

U.S. PATENT DOCUMENTS

| | | | | |
|---|---|---|---|---|
| 843,954 | A | * | 2/1907 | Long |
| 1,470,198 | A | * | 10/1923 | Miller et al. .................. 70/234 |
| 1,497,093 | A | * | 6/1924 | Dolan ........................... 70/15 |
| 2,315,516 | A | * | 4/1943 | Gray |
| 2,929,647 | A | * | 3/1960 | Gladstone .................... 292/60 |
| 3,330,585 | A | * | 7/1967 | Pollin ............. 292/DIG. 15 X |
| 3,698,135 | A | * | 10/1972 | Boots et al. ................... 49/35 |
| 3,739,609 | A |   | 6/1973 | Kaufmann .................... 70/234 |
| 3,749,295 | A | * | 7/1973 | Palmer ...................... 70/54 X |
| 3,857,575 | A | * | 12/1974 | Lee ............................... 280/1 |
| 3,934,436 | A |   | 1/1976 | Candlin et al. .............. 70/234 |
| 4,094,414 | A |   | 6/1978 | Thiot et al. .................. 211/1.3 |
| 4,513,938 | A |   | 4/1985 | Seymour .................... 248/507 |
| 4,542,914 | A | * | 9/1985 | Shopshire ................... 280/507 |
| 4,601,502 | A | * | 7/1986 | Van Dyke ........ 292/DIG. 15 X |
| 4,756,172 | A |   | 7/1988 | Weaver .......................... 70/58 |
| 5,054,237 | A | * | 10/1991 | Kapala et al. ................. 49/35 |
| 5,120,093 | A | * | 6/1992 | Carney ............ 292/DIG. 15 X |
| 5,192,159 | A | * | 3/1993 | Higginson ................... 404/11 |
| 5,553,715 | A | * | 9/1996 | Brotz ............................. 211/5 |
| 5,593,194 | A | * | 1/1997 | Liau ............... 292/DIG. 15 X |
| 5,623,843 | A | * | 4/1997 | Sands ........................... 70/234 |
| 5,743,411 | A | * | 4/1998 | Hawkes ....................... 211/20 |
| 5,855,129 | A | * | 1/1999 | Warren et al. ............... 70/234 |
| 5,899,101 | A | * | 5/1999 | West ........................ 70/235 X |
| 5,961,249 | A | * | 10/1999 | Hansen et al. ................ 404/9 |
| 5,983,685 | A | * | 11/1999 | Garnsworthy ............... 70/234 |
| 5,993,104 | A | * | 11/1999 | Marcotullio et al. ........... 404/6 |
| 6,336,245 | B1 | * | 1/2002 | Sakakibara ................ 16/85 X |
| 6,484,544 | B1 | * | 11/2002 | Wing ........................... 70/227 |

FOREIGN PATENT DOCUMENTS

| | | | | |
|---|---|---|---|---|
| CA | 1264699 | * | 1/1990 | .................. 70/233 |
| CH | 258495 | * | 5/1949 | ..................... 211/5 |
| GB | 2269616 | * | 2/1994 | .................. 49/131 |
| NL | 8101926 | * | 11/1982 | ..................... 211/5 |

* cited by examiner

*Primary Examiner*—Lloyd A. Gall
(74) *Attorney, Agent, or Firm*—Edward S. Wright

(57) ABSTRACT

Retractable hitching post for bicycles having a casing which is mounted in the ground, a post which is telescopically mounted in the casing for movement between a retracted position in which the post is below ground level and an extended position in which a substantial portion of the post is above ground level. The post can be secured in the extended position, and a bicycle can be locked to the post. In some disclosed embodiments, the post is cushioned by air damping as it returns to its retracted position.

10 Claims, 6 Drawing Sheets

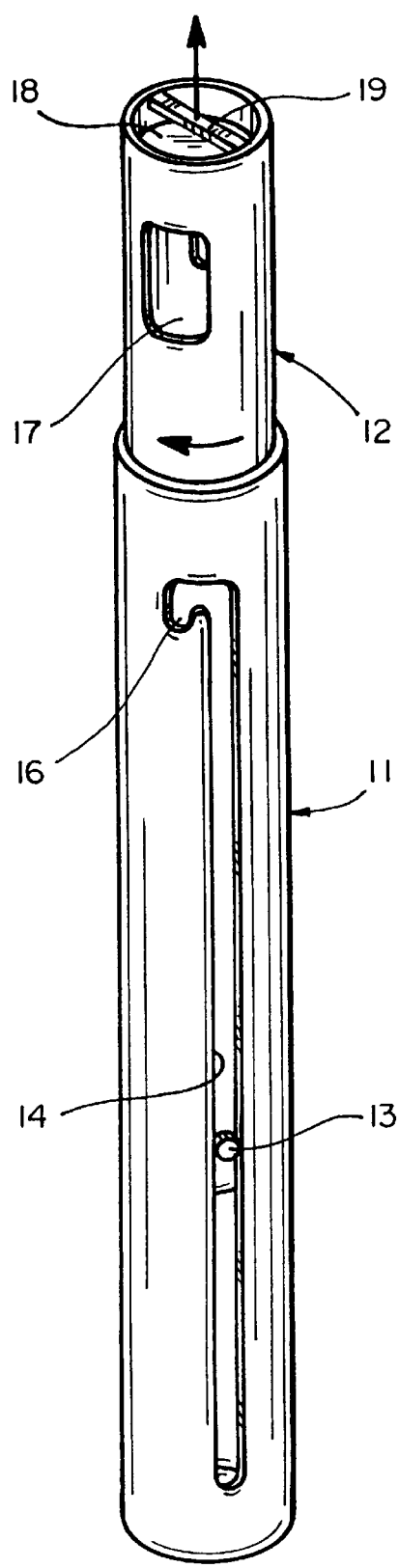
FIG_1

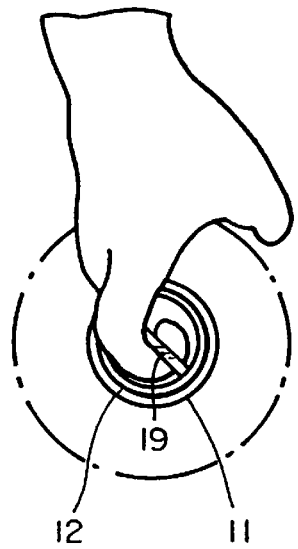
FIG_2
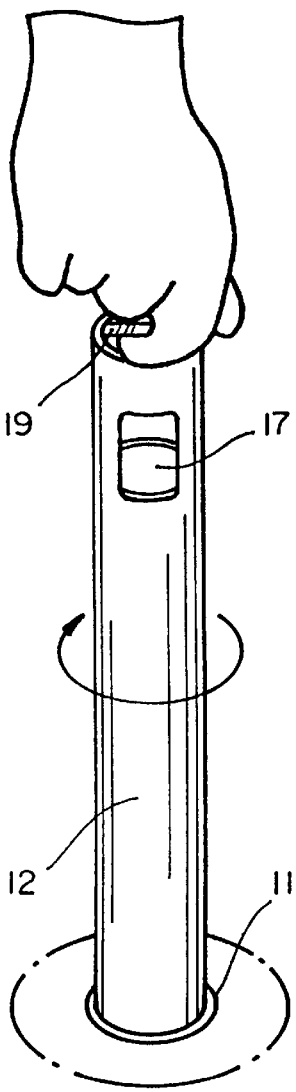
FIG_4
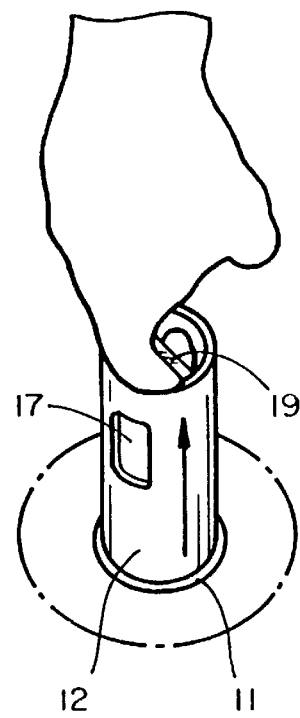
FIG_3

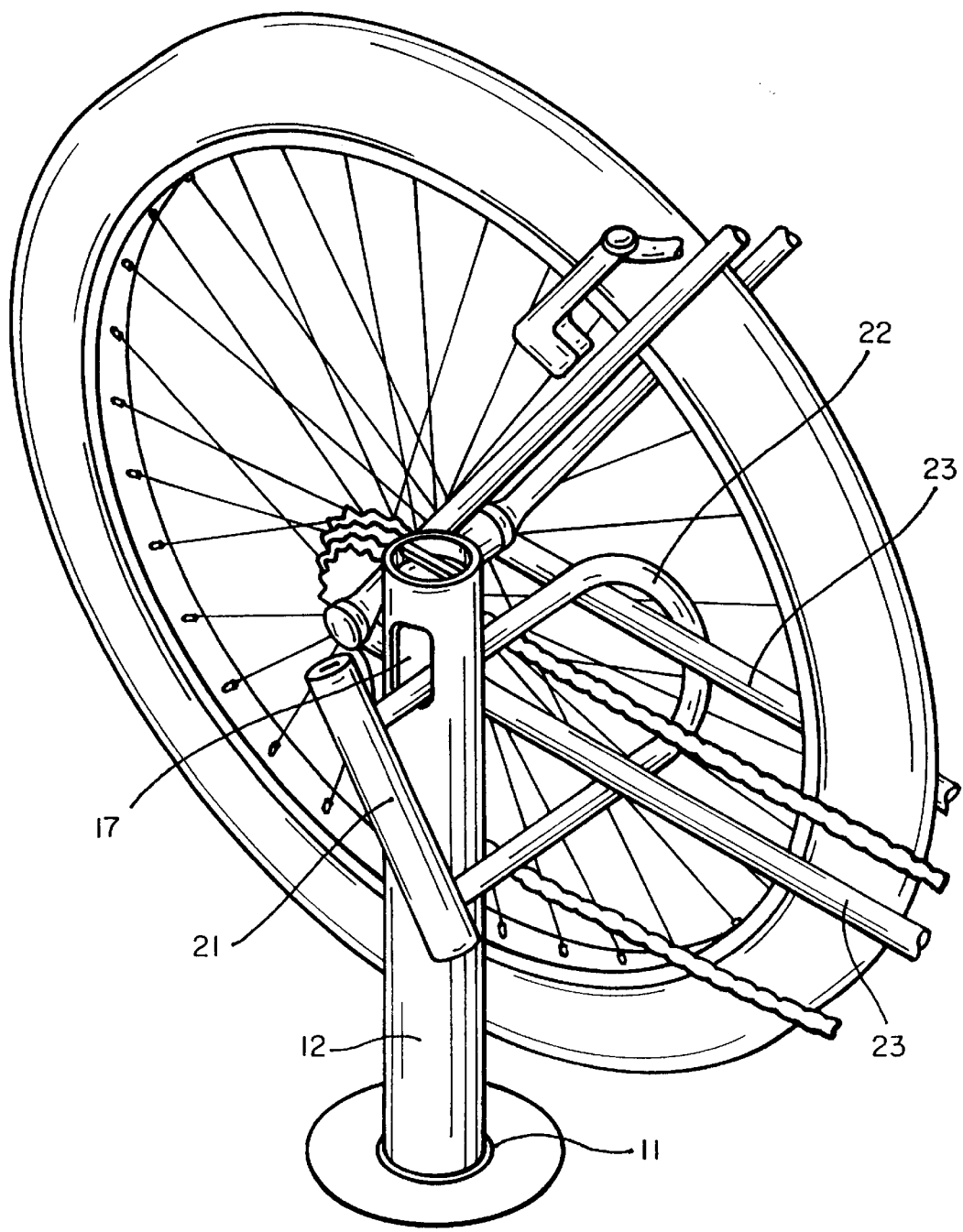
FIG_5

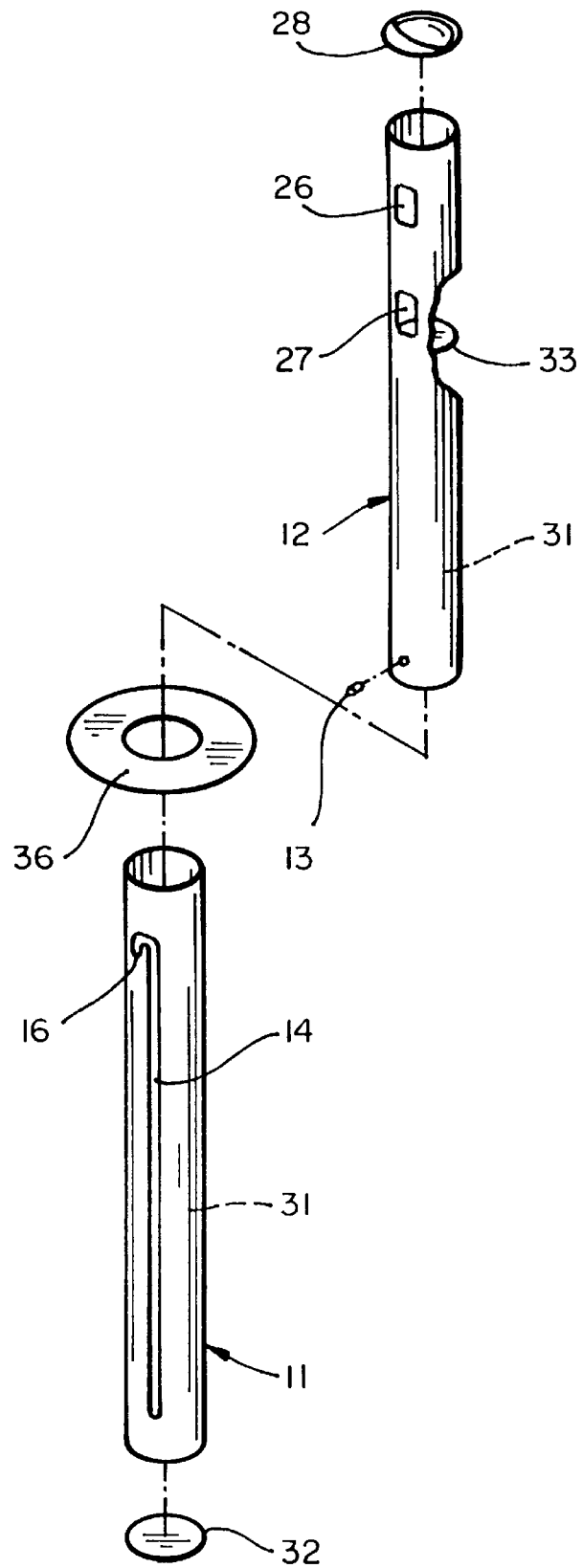
FIG_6

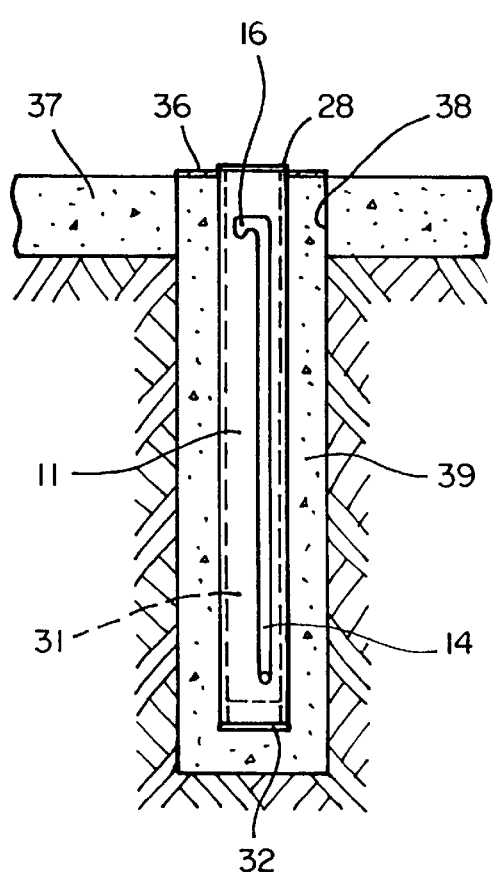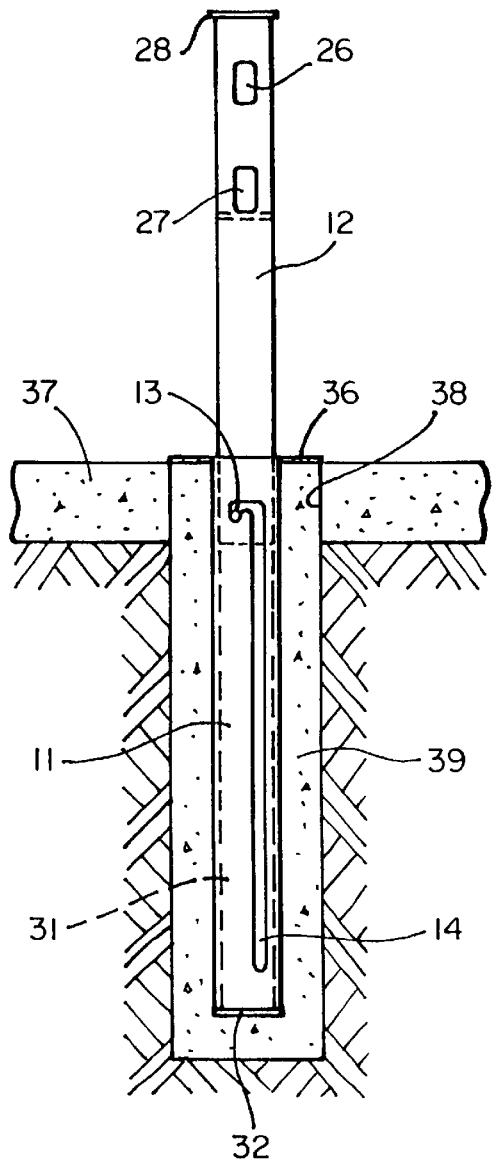
FIG_7  FIG_8

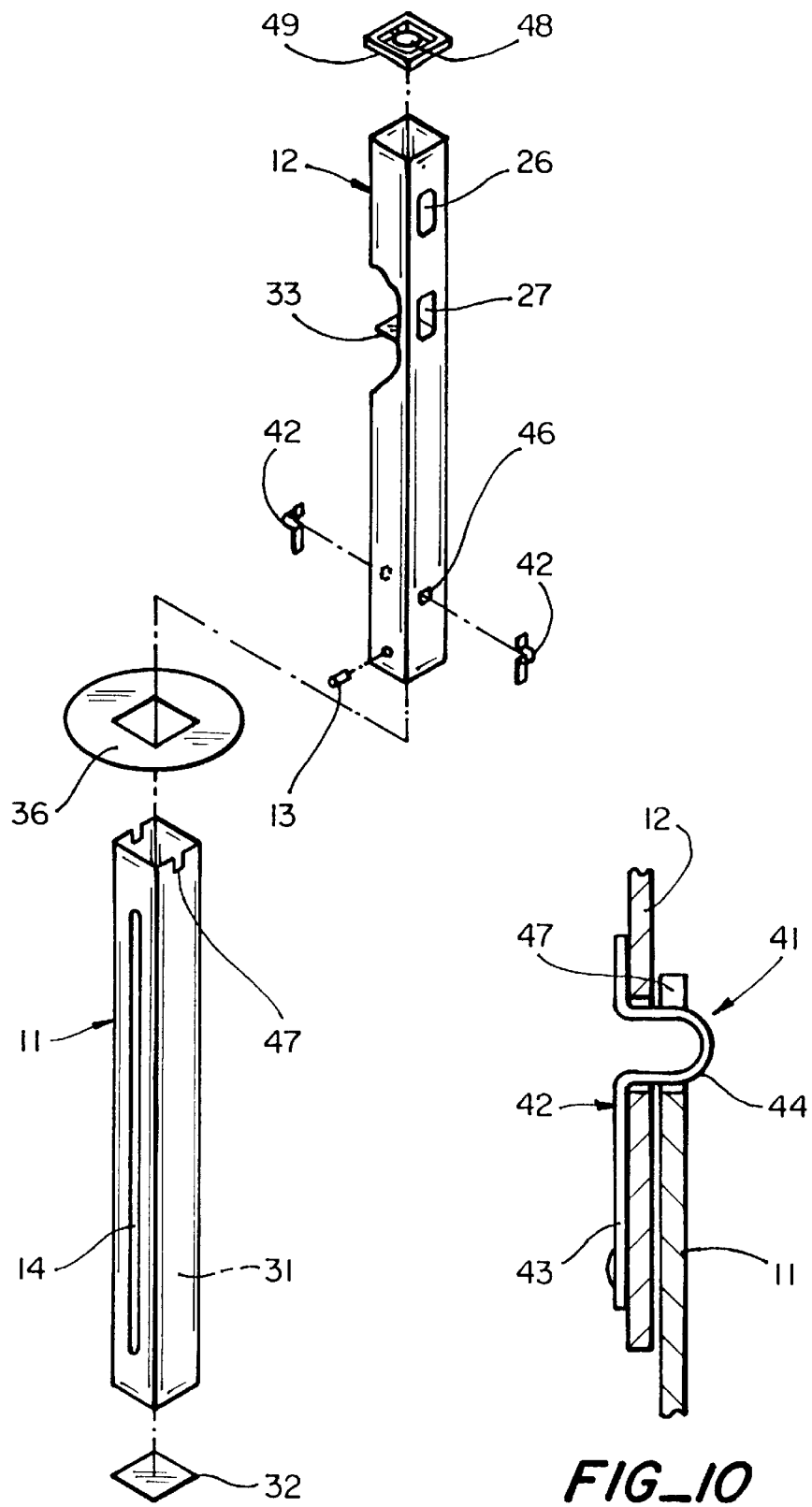
FIG_9
FIG_10

RETRACTABLE HITCHING POST FOR BICYCLES

BACKGROUND OF THE INVENTION

1. Field of Invention

This invention pertains generally to the parking and protection of bicycles and, more particularly, to a retractable hitching post for bicycles.

2. Related Art

With the popularity of bicycles in some communities, there is a need to park them where they will be safe and secure. Conventional bicycle racks can be unsightly and space consuming, particularly in crowded areas with a high degree of pedestrian and bicycle traffic.

OBJECTS AND SUMMARY OF THE INVENTION

It is in general an object of the invention to provide a new and improved hitching post for bicycles.

Another object of the invention is to provide a hitching post for bicycles of the above character which overcomes the limitations and disadvantages of the prior art.

These and other objects are achieved in accordance with the invention by providing a retractable hitching post for bicycles comprising a casing which is mounted in the ground, a post which is telescopically mounted in the casing for movement between a retracted position in which the post is below ground level and an extended position in which a substantial portion of the post is above ground level, means for securing the post in the extended position, and means carried by the post for engagement by a lock to secure a bicycle to the post. In some disclosed embodiments, the post is cushioned by air damping as it returns to its retracted position.

BRIEF DESCRIPTION OF THE DRAWINGS

FIG. 1 is an isometric of one embodiment of a retractable hitching post for bicycles incorporating the invention.

FIGS. 2–4 are operational views showing the hitching post in the embodiment of FIG. 1 being moved toward and secured in its extended position.

FIG. 5 is an operational view of the embodiment of FIG. 1, showing a bicycle secured to the hitching post.

FIG. 6 is an exploded isometric view, partly broken away, of another embodiment of a retractable hitching post for bicycles incorporating the invention.

FIG. 7 is a side elevational view of the embodiment of FIG. 6 in its retracted position.

FIG. 8 is a side elevational view of the embodiment of FIG. 6 in its extended position.

FIG. 9 is an exploded isometric view, partly broken away, of another embodiment of a retractable hitching post for bicycles incorporating the invention.

FIG. 10 is a fragmentary vertical sectional view of the embodiment of FIG. 9, illustrating the post extended and the detent mechanism in its latched position.

DETAILED DESCRIPTION

As illustrated in FIG. 1, the retractable hitching includes an elongated tubular casing 11 of circular cross-section which is adapted to be mounted in the ground in an upright position. An elongated post 12 is telescopically mounted in the casing for movement between retracted and extended positions. In the retracted position, the post is disposed entirely within the casing and below ground level, and in the extended position, the post extends above ground. In this embodiment, the post is also a tubular member of circular cross-section.

Means is provided for holding the post in its extended position. This means includes a pin 13 which is affixed to the post and received in a slot 14 in the casing. The slot extends longitudinally of the casing and has a length corresponding to the distance travelled by the post in moving between its retracted and extended positions. At its upper end, the slot terminates in a laterally offset notch 16 in which the pin can rest to hold the post in the extended position. In addition to serving as a latch, the pin also functions as a guide pin which limits the travel of the post within the casing.

An opening 17 is formed in the post toward its upper end for receiving a lock to secure a bicycle to the post.

The upper end of the tube which forms the post is closed by a disk or plug 18 that is recessed a short distance below the top, and a crossbar 19 extends diagonally of the tube above the disk to provide a fingerhold for use in moving the post between its retracted and extended positions.

When the hitching post is not in use, it is left in its retracted position, with post 12 fully lowered into casing 11. When a cyclist desires to use the hitching post, he slips a finger under crossbar 19 and pulls up on it, as illustrated in FIGS. 2–3, to raise the post toward its extended position. When the post reaches the extended position, pin 13 abuts against the wall at the upper end of slot 14, and the cyclist then rotates the post a few degrees about its vertical axis, as shown in FIG. 4, to position the pin in notch 16, which then retains the post in the extended position.

The cyclist can then secure his bicycle to the post with a suitable device such as a lock 21 having a shackle 22 which, as shown in FIG. 5, passes around the rear fork 23 of the bicycle and through the opening 17 in the post. Other suitable securing devices such as chains or cables can be used instead of the lock, and they can pass around any desired portion of the bicycle.

When the cyclist is done using the hitching post, he removes the lock, turns the post to disengage the pin from the notch, and lowers the post back into the ground.

The embodiment of FIG. 6 is generally similar to the embodiment of FIG. 1, and like reference numerals designate corresponding elements in the two embodiments. Instead of a single opening for the bike lock, the embodiment of FIG. 6 has a pair of openings 26, 27 for receiving one or both of the legs of the shackle of a bike lock. This embodiment also has a pull ring 28 at the upper end of the post for use in raising and lowering the post.

Means is provided for cushioning or retarding the downward movement of post 12 as it returns to its retracted position. This means includes an air damper or dashpot formed by closing off the lower end of casing 11 and the interior of post 12 to form a chamber 31 from which the flow of air is limited. The lower end of the casing is closed by an end cap 32, and the interior of the post is closed below shackle openings 26, 27 by a plug 33. The walls of the tubes do not form a perfect seal, and air can escape between them, but only to a limited extent. If a lesser amount of damping is desired, air passages or orifices can be formed in plug 18 and at the top of the post.

An annular finishing ring 36 is provided at the upper end of casing 11 to give the hitching post a finished appearance when it is set in the ground.

As illustrated in FIGS. 7 and 8, the hitching post can be installed in an existing sidewalk 37 by drilling a hole 38 through the sidewalk and into the earth below. The hitching post is then set into the hole with the upper end of casing 11 substantially flush with the top of the sidewalk, and the region between the casing and the wall of the hole is filled with a suitable material 39 such as concrete or epoxy. The finishing ring is then set in place around the top of the casing.

When the post is retracted, it is substantially flush with the finishing ring and the surface of the sidewalk. It is, thus, substantially out of sight and is not a hazard for people to trip over.

The embodiment of FIG. 9 is similar to the embodiment of FIG. 6, and like reference numerals designate corresponding elements in two embodiments. In the embodiment of FIG. 9, however, casing 11 and post 12 have a rectangular or square cross-section, and a detent mechanism 41 is provided for holding the post in its raised position.

The detent mechanism comprises a pair of leaf springs 42 which have arms 43 that are affixed to the inner side wall of the tube. The upper portions of the spring arms are bent to form buttons 44 which extend through openings 46 on opposite sides of the tube and are urged toward an outward or extended position by the spring arms. The buttons are received in notches 47 at the upper end of casing 11 when the post is in its raised position. As the post is being raised and lowered, the buttons bear against the inner wall of the casing, and the outer surfaces of the buttons are rounded to ensure a smooth sliding action.

This embodiment also differs from the others in that a pull ring 48 is pivotally mounted in a cap 49 which is affixed to the upper end of the post.

Operation and use of the embodiment of FIG. 9 is similar to that of the other embodiments. With the noncircular cross-section of the casing and post, however, it is not necessary to rotate the post to retain it in its raised position. Instead, as the post reaches its raised position, detent buttons 44 move into notches 47, latching the post in that position. The post is retracted by depressing the buttons to disengage them from the notches and letting the post fall back into the casing.

Although the detent mechanism has been illustrated specifically in connection with a noncircular casing and post, it is not limited to that application, and it could just as well be used with a circular post and casing, if desired.

It is apparent from the foregoing that a new and improved hitching post for bicycles has been provided. While only certain presently preferred embodiments have been described in detail, as will be apparent to those familiar with the art, certain changes and modifications can be made without departing from the scope of the invention as defined by the following claims.

What is claimed is:

1. A bicycle hitching system, comprising:
   a retractable hitching post having a casing mounted in the ground, a post telescopically mounted in the casing for movement between a retracted position in which the post is below ground level and an extended position in which a substantial portion of the post is above ground level, means for securing the post in the extended position, and an opening which extends crosswise of the post;
   a bicycle; and
   a lock having a shackle which passes through the opening and around a frame member of the bicycle to secure the bicycle to the post.

2. The bicycle hitching system of claim 1 wherein the casing and the post are of circular cross-section, and the means for securing the post in the extended position includes a latch which is engaged by rotation of the post within the casing.

3. The bicycle hitching system of claim 1 including a fingerhold at the upper end of the post for use in lifting the post out of the ground.

4. The bicycle hitching system of claim 1 including means for damping movement of the post toward Its retracted position.

5. The bicycle hitching system of claim 1 wherein the means for securing the post in the extended position includes a detent mechanism which is engaged when the post is in the extended position.

6. A bicycle hitching system, comprising a retractable hitching post having a tubular casing mounted in the ground in an upright position, a post telescopically mounted in the casing for movement between extended and retracted positions, a guide pin which extends radially between the post and the casing and is received in a longitudinally extending slot having a laterally extending section atone end for retaining the post in its extended position when the post is raised and rotated to bring the pin into the laterally extending section, an opening in the post, a bicycle, and a lock having a shackle which passes through the opening and around a frame member of the bicycle to secure the bicycle to the post.

7. The bicycle hitching system of claim 6 including a pull ring at the upper end of the post.

8. The bicycle hitching system of claim 6 wherein the post is a hollow tubular member of circular cross-section with a diametrically extending crossbar at its upper end for use in lifting the post out of the ground.

9. A retractable hitching post for bicycles, comprising: a casing which is mounted in the ground and closed at its lower end, a tubular post which is telescopically mounted in the casing for movement between extended and retracted positions, an opening which extends crosswise of the post, a plug in the tubular post below the opening, and a chamber between the plug and the lower end of the casing from which air flow is limited to damp of the post toward its retracted position, a bicycle, and a lock having a shackle which passes through the opening and around a frame member of the bicycle to secure the bicycle to the post.

10. A retractable hitching post having a casing which is mounted in the ground, a retractable post which is telescopically mounted in the casing and extends above ground level in an extended position, means which secures the post in the extended position, an opening which extends crosswise through the post, a bicycle, and a lock having a shackle which passes through the opening in the post and around a frame member of the bicycle to secure the bicycle to the post.

* * * * *